3,335,996
VARIABLE DAMPING CONTROL FOR SEATS
Garth O. Hall, Brookfield, Arthur O. Radke, Shorewood, and Harvey N. Tengler, New Berlin, Wis., assignors to Bostrom Corporation, Milwaukee, Wis., a corporation of Wisconsin
Filed Sept. 10, 1965, Ser. No. 486,309
4 Claims. (Cl. 248—400)

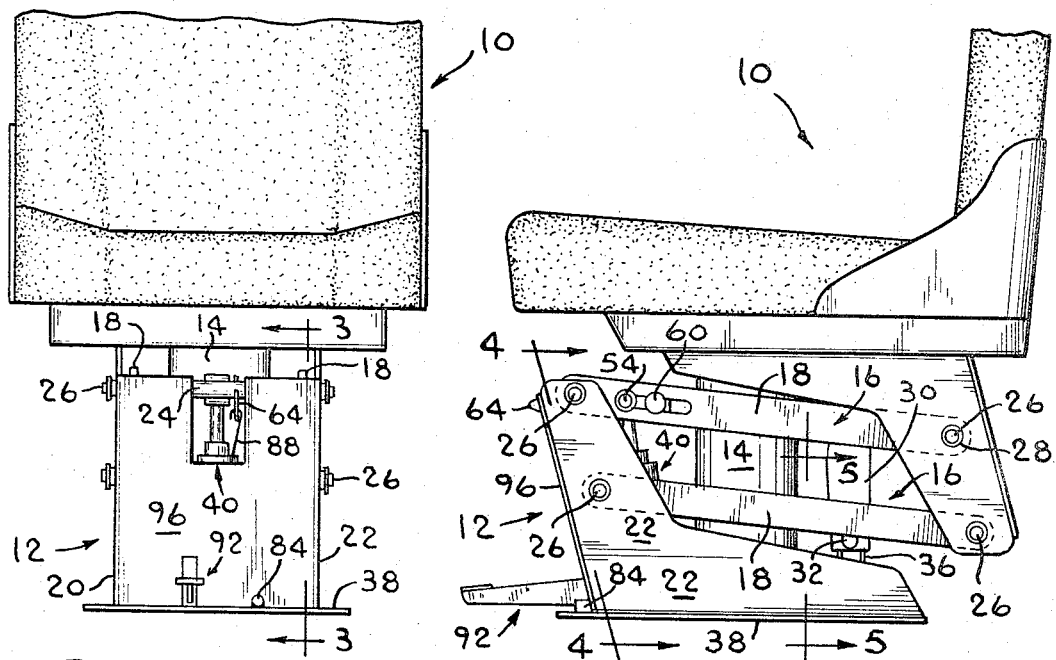
FIG. 1
FIG. 2
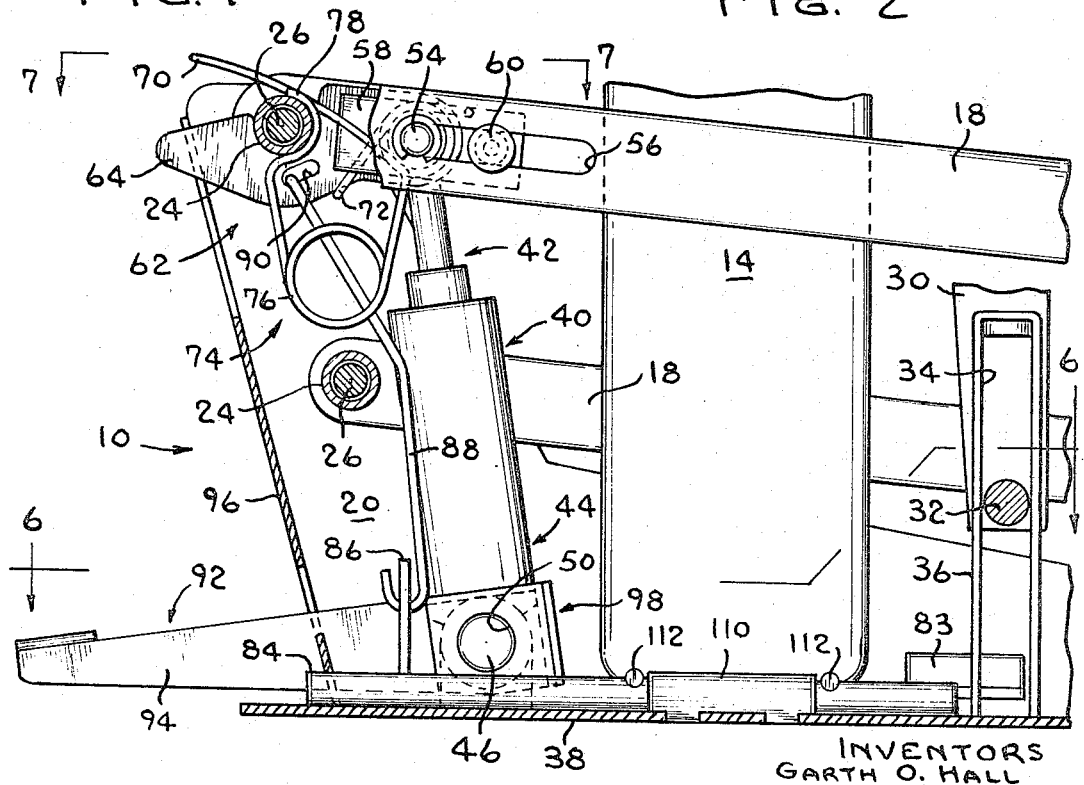
FIG. 3
INVENTORS
GARTH O. HALL
ARTHUR O. RADKE
HARVEY N. TENGLER
BY Andrew O. Lewis
ATTORNEY

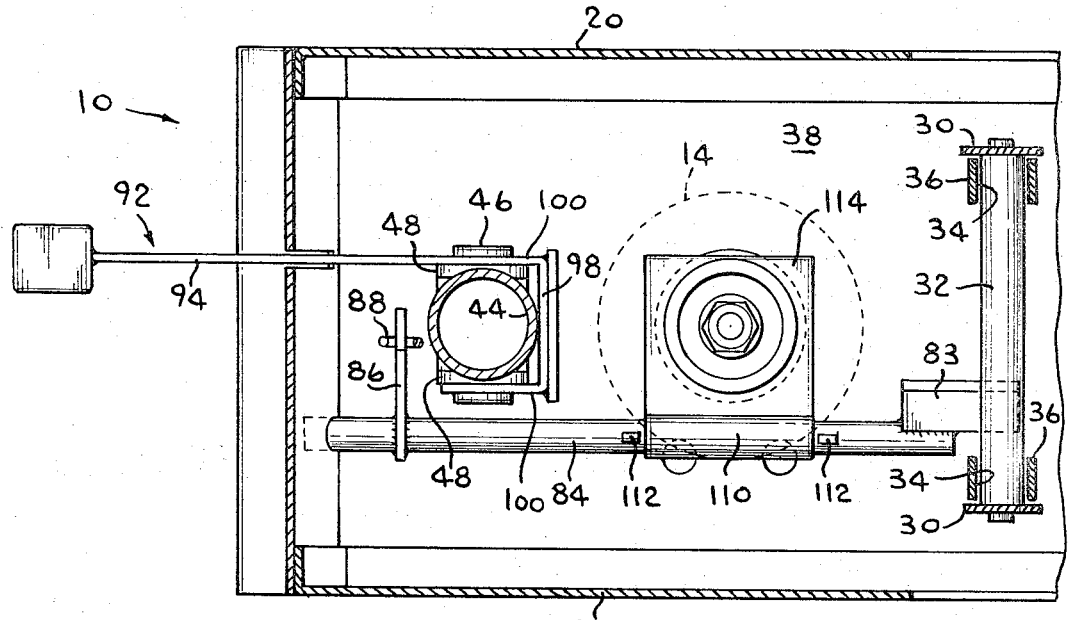
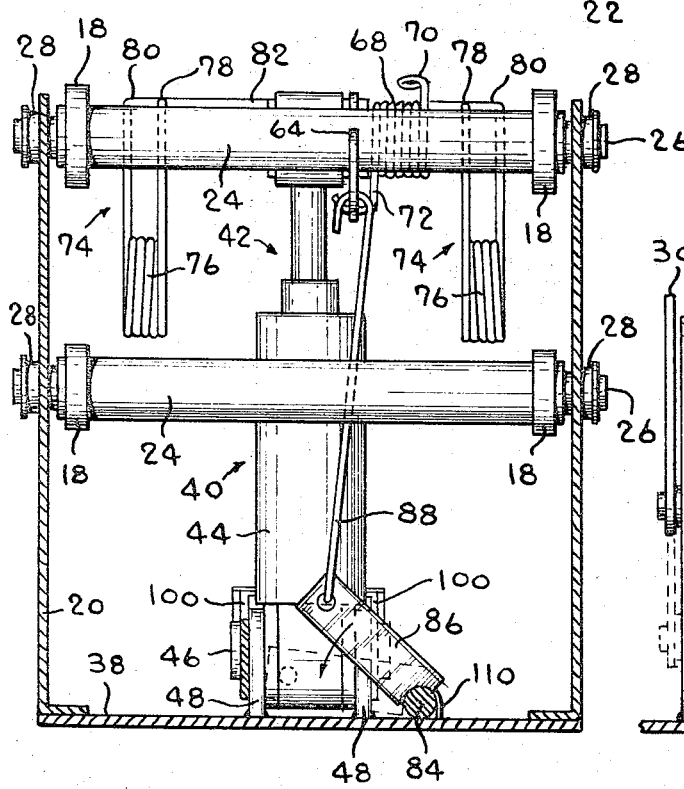
FIG. 6
FIG. 5
FIG. 4
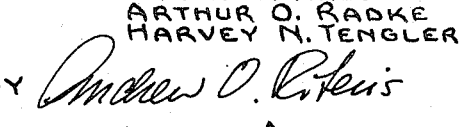
INVENTORS
GARTH O. HALL
ARTHUR O. RADKE
HARVEY N. TENGLER
BY Andrew O. Ritens
ATTORNEY Aug. 15, 1967  G. O. HALL ET AL  3,335,996
VARIABLE DAMPING CONTROL FOR SEATS
Filed Sept. 10, 1965  3 Sheets-Sheet 3
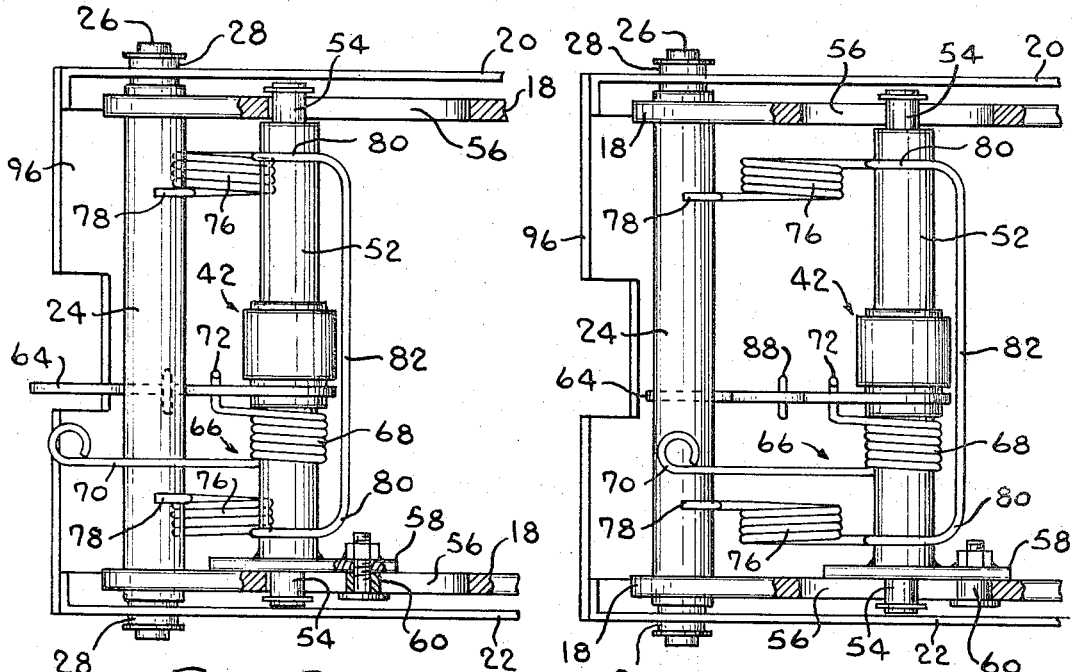
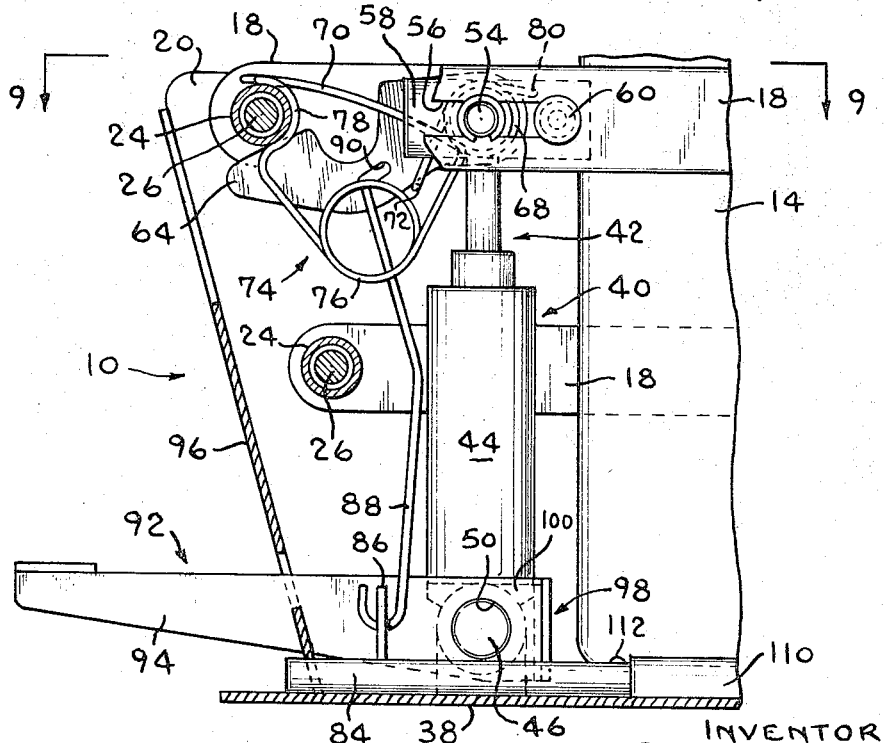
INVENTORS
GARTH O. HALL
ARTHUR O. RADKE
HARVEY N. TENGLER
BY Andrew O. Riteris
ATTORNEY

United States Patent Office 3,335,996
Patented Aug. 15, 1967

ABSTRACT OF THE DISCLOSURE

The present invention is embodied in a vehicle seat which is suspended on a base member by a parallelogram linkage and is biased away from the base by an air spring. A shock absorber is connected to the base and to the upper link of the parallelogram linkage. The latter connection is comprised of a slot within the link, a latch which maintains the shock absorber at one end of the slot, and a spring mechanism which biases the shock absorber towards the other end of the slot. The latch is actuated wherever the oscillatory motion of the seat is fairly large and on such occasions the spring moves the shock absorber to the other end of the slot to thereby increase the damping of the suspension system. A foot pedal is provided to permit the occupant to move the shock absorber back to the latched position.

This invention pertains to improvements in vehicle seats and particularly to improvements in seats in which springs as well as damping means connect the seat and base parts. Seats of this type are generally used in trucks, tractors, agricultural machinery, and other applications in which, at least on occasions, fairly severe vibrations are encountered.

The principal object of the present invention is to provide a vehicle seat in which the damping of the seat part's oscillatory motion may be varied in accordance with the type of vibration to which the base part of the seat is subjected.

A further object of this invention is to provide a vehicle seat in which the damping means may be automatically changed from a moderate damping position to a higher damping position in response to the oscillation of the seat beyond a predetermined amplitude.

A further object of the present invention is to provide compactness and simplicity of design to the seat structure having a damping adjustment.

In essence, these objects are attained by providing a shock absorber between the seat and base parts of the vehicle seat and by varying the effectiveness of the shock absorber by a change of the relative position of the shock absorber in respect to these parts so as to vary the stroke of the shock absorber accordingly. In other words, the variance in damping provided to the oscillatory motion of the seat is attained by changing the mechanical advantage of the shock absorber. This feature provides fairly simple and compact adjustment of the damping characteristics of the vehicle seat without requiring any changes in valving of the shock absorber as such. Further, the vehicle seat embodying the present invention is provided with spring means which can be automatically actuated in response to seat vibrations of a given amplitude to thereby move the shock absorber from a position at which moderate damping is provided to a higher damping position. When the occupant believes that the high vibrating condition has passed, he may actuate a manual control to reset the shock absorber back to the moderate damping position.

Other objects and advantages will be pointed out in, or be apparent from the description and claims, as will obvious modifications of the one embodiment shown in the drawings, in which:

FIG. 1 is a front elevation view of a vehicle seat embodying the present invention;
FIG. 2 is a side elevation view thereof;
FIG. 3 is an enlarged fragmentary cross sectional view taken on line 3—3 of FIG. 1;
FIG. 4 is an enlarged cross sectional view taken on line 4—4 of FIG. 2;
FIG. 5 is an enlarged cross sectional view taken on line 5—5 of FIG. 2 with the actuating member being shown in broken lines in a position at which the seat oscillation has reached a sufficient amplitude to automatically move the shock absorber from a moderate damping position to a higher damping position;
FIG. 6 is a cross sectional view taken on line 6—6 of FIG. 3 with the air spring being only shown in broken lines for the sake of clarity;
FIG. 7 is a fragmentary top view taken on line 7—7 of FIG. 3;
FIG. 8 is a view similar to FIG. 3 but showing the shock absorber moved to the higher damping position; and
FIG. 9 is a fragmentary top view taken on line 9—9 of FIG. 8.

Referring to the drawings in detail, the illustrated vehicle seat is comprised of a seat part 10 and a base part 12 which are biased apart by an air spring 14 and are connected to each other by two frame shaped link members 16 which have their arms 18 pivotally connected to the sidewalls 20 and 22 of the base and seat parts respectively. Each pair of arms is rigidly connected to each other by tubular cross members 24 which receive the pins 26. The pins extend through the sidewalls and are maintained in a fixed position by bushings 28. This structure represents the well-known parallelogram linkage in which the spring provides the biasing characteristics to the seat and the parallelogram link members 16 limit the relative movement between the seat and base parts to a predetermined path.

The upper and lower limits of the seat's stroke or oscillatory motion is determined by a stop member which is fixed to the seat part and is comprised to two dependent ears 30 and a cross member 32. The cross member 32 extends through a slot 34 provided in upstanding frame members 36 which are fixed to the floor plate 38 of the base part on both sides of the seat. When the seat is occupied by an average weight person, the cross member 32 is moved by the weight of the occupant to a position approximately intermediate the upper and lower limits of slots 34. This position is defined as the ride position of the seat. As the base part is subjected to vibrations, the seat part will, of course, oscillate in respect thereto with the maximum amplitude of the oscillation being limited by the top and bottom of the slots 34.

A shock absorber 40 having a piston component 42 and a cylinder component 44 is connected between the seat and base parts to damp the relative oscillatory motion between these parts. The cylinder 44 is pivotally connected to the base part by a pin 46 which extends through two upstanding ears 48 fixed to the floor plate 38 and through the eye of 50 provided at the bottom of the cylinder. The piston of 42 is pivotally connected to the arms 18 of the upper link member by means of a transversely extending rod 52 which has stub shaft portions 54 at each of its ends extending through slots 56 provided in each of the arms 18. This structure permits the shock absorber to pivot in respect to the arms 18 as well as to slide in the slots 56. A plate 58 having a stop 60 is welded to one end of the rod 52 and limits the inward movement of the shock absorber.

The shock absorber may be moved between two positions in the slots 56, a moderate damping position (FIG. 3) and a higher damping position (FIG. 8). In the moderate damping position, the pivotal connection between the piston 42 and the upper link member is fairly close to the front pivoting point (pin 26) of the link member. In the higher damping position, the pivotal connection is further removed from the pivoting point. Because of this in the former position the relative travel between the shock absorber components per stroke of the seat part is less than in the latter position and thereby, of course, less damping is provided at the former position than at the latter.

The shock absorber is maintained in the moderate damping position by a spring biased latching mechanism 62. The latching mechanism is essentially comprised of a latch 64 which is biased to the engaging position with the front cross member 24 by a wire spring 66. The spring has a coil 68 wound around the rod 52 and has one of its ends 70 in engagement with the top face of cross member 24 and has its other end 72 in engagement with the bottom of the latch thereby biasing it in a clockwise direction when viewed in FIG. 3. A second wire spring 74 biases the shock absorber from the moderate damping position to the higher position. The wire spring 74 has two coils 76 and has its free ends 78 curled around and in engagement with the top surface of the cross members 24 and has two intermediate portions 80 curled around an engagement with the rod 52. The two portions 80 are connected by and are integral with a transversely extending spring portion 82.

The shock absorber is moved from the moderate damping position to the high damping position when the seat part reaches the bottom of its stroke. At such time the cross member 32 engages the striker plate 83, as shown in broken lines in FIG. 5, and turns a shaft 84 to which the striker plate is connected in a counterclockwise direction when viewed in FIG. 4. The rotation of the shaft 84 causes a downward movement of lever 86 which is fixed at the front of the shaft and which is connected by means of wire 88 to the latch. The wire is hooked in slots 90 of the latch. This action causes the latch to move downwardly against the bias of spring 66 to a disengaging position and, thus, permits the wire spring 74 to move the shock absorber to the higher damping position. The shock absorber remains in this position until it is moved back to the moderate damping position by the occupant. This is accomplished by the depression of lever member 92 which is connected to the bottom of the shock absorber cylinder 44 thereby causing the shock absorber to pivot from the position shown in FIG. 8 to that shown in FIG. 3.

The lever member has a pedal section 94 extending through the front wall 96 of the base part, a back section 98 in engagement with the rear of the cylinder 44, and two side sections 100 which are provided with appropriate apertures to permit pivotal connection to the pin 46.

The shaft 84 is mounted on the floor plate of the base member by a bracket 110 and is prevented from axial movement by nibs 112. The bracket also has an inwardly extending plate section 114 (FIG. 6) which serves as a base member for the air spring 14.

Although but one embodiment of the present invention has been illustrated and described, it will be apparent to those skilled in the art that various changes and modifications may be made therein without departing from the spirit of the invention or from the scope of the appended claims.

We claim:
1. A vehicle seat comprising:
a seat part;
a base part;
spring means connecting said seat part to said base part for biased oscillatory motion above and below a ride position of said seat part when said base part is subjected to vibrations;
damping means having two relatively movable components and operable to provide damping in accordance with the relative movement between said components;
means connecting said damping means between said seat and base parts to provide damping to said oscillatory motion, said connecting means including adjustment means to change the relative position at said ride position of said damping means in respect to said seat and base parts to thereby accordingly change the extent of said relative movement between said damping means components and, thus, vary the amount of damping provided to the oscillatory motion of said seat part; said adjustment means including means releasably locking said damping means between said seat and base parts in a first position in which said damping means provides predetermined damping characteristics to said oscillatory movement;
said adjustment means further including biasing means which urges said damping means from said first position to a second position in which said damping means provides different damping characteristics than said predetermined characteristics;
and means responsive to oscillatory movement of said seat part past a predetermined amplitude to release said locking means and thereby cause said biasing means to move said damping means to said second position.

2. A vehicle seat comprising:
a seat part;
a base part;
spring means connecting said seat part to said base part for biased oscillatory motion in respect to said base part;
a link pivotally connected to said base and said seat parts;
damping means having two relatively movable components and operable to provide damping in accordance with the relative movement between said components, one of said components being pivotally connected to one of said parts and the other of said components being pivotally connected to said link intermediate the ends of said link and being movable between a plurality of positions intermediate said ends to thereby vary the damping which is provided to said oscillatory motion;
means releasably locking said other of said components to said link at a location in which said damping means provides moderate damping to said oscillatory movement;
biasing means urging said other of said components towards a position at which said damping means provides increased damping;
means responsive to oscillatory motion of said seat part beyond a predetermined amplitude to release said locking means and thereby cause said biasing means to move said other of said components to said position at which increased damping is provided.

3. A vehicle seat according to claim 2 wherein said one of said components is pivotally connected to said base part and is provided with a lever member by means of which said damping means may be pivoted in respect to said base part to thereby move said other of said components from said position providing increased damping to said position providing moderated damping.

4. In a vehicle seat having a seat part;
a base part;
spring means connecting said seat part to said base part for biased oscillatory movement; and damping means having two relatively movable components and operable to provide damping in accordance with the relative movement between said components; the combination of:

first connecting means connecting the damping means to the base part;

second connecting means connecting the damping means to a member which is connected to said seat part and moves in respect to said base part in accordance with the relative movement of said seat part in respect to said base part during oscillation of said seat part;

one of said connecting means being comprised of a pivotal connecting structure;

the other of said connecting means including a movable pivot connecting structure between said member and said damping means; said other of said connecting means further including latch means releasably latching said damping means to said member and maintaining said movable pivot connecting structure in a first position to thereby maintain said damping means in a predetermined first position in respect to said seat and base parts, and said other of said connecting means further including spring means which biases said movable pivot connecting structure to a second position to which said movable pivot connecting structure is moved by said spring means upon release of said latch means to thereby move said damping means to a predetermined second position in respect to said seat and base parts; and lever means connected to said damping means and operable to be actuated to move said damping means from said second position to said first position at which said latch means latches said damping means to said member.

References Cited

UNITED STATES PATENTS

| | | | |
|---|---|---|---|
| 2,829,703 | 4/1958 | Knoedler | 248—400 X |
| 2,840,140 | 6/1958 | Harrington | 248—400 X |
| 2,991,970 | 7/1961 | White et al. | 248—378 X |
| 3,061,260 | 10/1962 | Simons et al. | 248—399 |
| 3,075,736 | 1/1963 | Freedman | 248—400 |
| 3,211,411 | 10/1965 | Rood | 248—399 |
| 3,268,200 | 8/1966 | Eicher | 248—399 |

ROY D. FRAZIER, *Primary Examiner.*

CLAUDE A. LEROY, *Examiner.*

R. P. SEITTER, *Assistant Examiner.*